United States Patent Office 2,840,514
Patented June 24, 1958

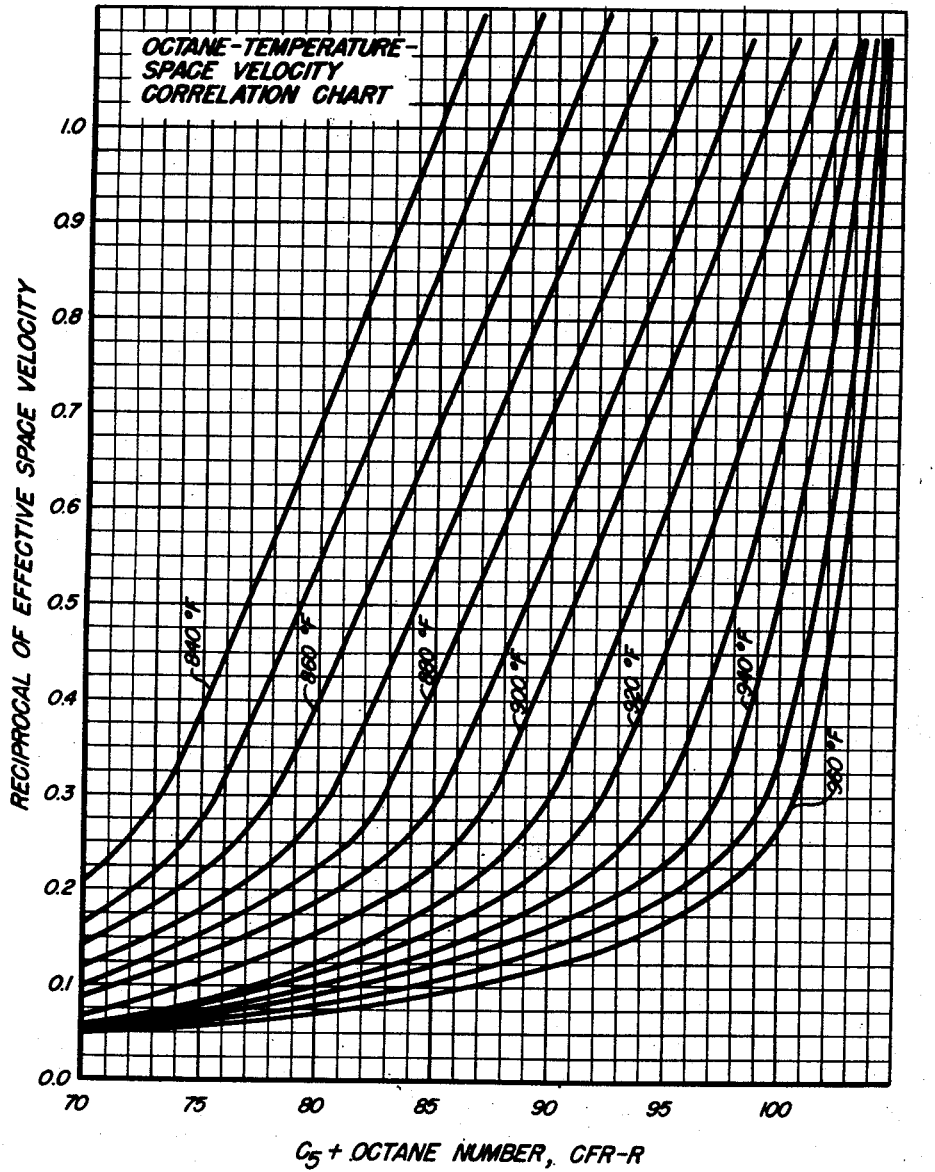

2,840,514

IMPREGNATED PLATINUM-ALUMINA CATALYSTS

Harry M. Brennan, Whiting, Herman S. Seelig, Valparaiso, and Roy W. Vander Haar, Highland, Ind., assignors to Standard Oil Company, Chicago, Ill., a corporation of Indiana Application August 20, 1954, Serial No. 451,128

18 Claims. (Cl. 196—50)

Our invention relates to the hydroforming of hydrocarbons. More particularly, it relates to an improved catalyst for the hydroforming of hydrocarbons and to a method for the preparation thereof.

Within recent years, a continuing demand for motor fuels of improved octane rating has brought about a number of important changes in the technology of petroleum refining. Among the more important developments has been an improved hydroforming process, employing a catalyst which consists essentially of a small proportion of platinum deposited upon an alumina support. A catalyst of this type, containing 0.6 percent by weight of platinum, based on dry $Al_2O_3$, is ordinarily employed at a temperature between about 850 and 1000° F., a pressure between about 50 and 1000 pounds per square inch gage, a charging-stock hourly weight space velocity between about 0.5 and 10, and a hydrogen rate of about 2,000 to 10,000 standard cubic feet per barrel of charging stock. Under these conditions, the catalyst is initially capable of upgrading a 50 CFR-R octane number naphthenic naphtha into a stabilized 10-pound Reid 400° F. end-point gasoline of 90 CFR-R octane number or better in a yield of 90 percent by volume. This represents a remarkable advance over the processes and catalysts of the prior art, as exemplified by processes employing molybdena-alumina, chromia-alumina, and the like.

A major problem in the preparation of platinum-alumina catalysts, especially catalysts prepared by impregnation of solid, particulate alumina, has been the achievement of a uniform distribution of the platinum within the alumina structure. Such a distribution is desirable in order to expose as great an area of platinum surfaces as possible, to make fullest use of the alumina supporting material, and to protect the platinum against loss by attrition, which would tend to occur if the active metal were concentrated on the outer surface of the alumina. The prior-art impregnation techniques are only partially effective in accomplishing this result. Impregnation of solid alumina with aqueous chloroplatinic acid solution deposits the platinum compound largely in the outer region of the alumina pellets. Somewhat better results are obtained by subjecting the chloroplatinic acid solution to a preliminary treatment with hydrogen sulfide, but the resulting platinum sulfide suspension is quite unstable; and being a solid suspension, it has inherent shortcomings as an impregnating medium.

We have now discovered an improved technique for effecting a uniform distribution of platinum throughout solid, hydrous alumina of limited water content and for simultaneously obtaining a platinum-alumina catalyst of greatly improved activity and other properties. Our invention involves the impregnation of solid alumina containing from about 1 to 30 percent by weight of combined water, anhydrous basis, with a solution of a platinum compound in the presence of an inorganic water-soluble aluminum salt, such as aluminum chloride, aluminum nitrate, or the like. In practicing the invention, we deposit in the said alumina, before or during the addition thereto of about 0.01 to 1 percent by weight of platinum, a proportion of a salt of the said class in the ratio of about 0.001 to 0.02 mole per mole of anhydrous $Al_2O_3$, and calcine the resulting composition.

It is an object of our invention to improve the hydroforming of hydrocarbons. Another object is to increase the hydroforming activity of platinum-alumina catalysts. A further object is to improve the distribution of platinum in platinum-alumina catalysts. A further object is to improve the activity of platinum hydroforming catalysts, calculated in terms of their platinum content. A further object is to extend the effectiveness and utility of platinum-alumina hydroforming catalysts. Other objects will be apparent from the following description.

The alumina suitable for use in connection with our invention may be described as solid, hydrous alumina, or alumina of the xerogel type, containing from about 1 to 30 percent by weight of combined water, anhydrous basis, preferably from about 1 to 20 percent, and optimally between about 1 and 10 percent. It can be prepared by drying and/or calcining alumina gels or sols, specifically alumina hydrogels, hydrosols, ultragels, or the like, at temperatures of about 400 to 1300° F., preferably about 800 to 1200° F., for periods of 1 to 24 hours or longer to the desired water content, whereby the alumina is converted in major part into the monohydrate or to a lower state of hydration. For example, alumina hydrogel is precipitated from an aluminum salt solution by addition of alkali, and is thereafter washed to remove impurities therefrom, and dried. As another example, a Heard-type alumina hydrosol, prepared as described in Reissue Patent 22,196 (October 6, 1942), is gelled, dried and calcined. As a further alternative, an aluminum alkoxide is hydrolyzed and the resulting alumina gel is separated and dried. Various other alternative techniques will be apparent to those skilled in the art. In all cases, the product alumina is a solid, porous material of considerable surface activity, and retains at least a small proportion of water, around 1 percent or more, within the gel lattice. The alumina should be substantially free from deleterious impurities, such as alkali metals, manganese, molybdenum, iron, cobalt, nickel, and the like and should preferably contain 99.99 percent or more of $Al_2O_3$, dry basis, exclusive of catalytically inert substances. At an appropriate point in our process, either before or after the alumina is commingled with platinum and aluminum salt, the alumina or the catalytic composite based thereon is formed into physical shapes adapted to the hydroforming process for which the catalyst is intended. For thus purpose, the techniques and conditions employed in the prior art are satisfactory.

The advantageous results of our invention can be achieved in a variety of ways. We may, for example, prepare solid hydrous alumina of the hereinabove defined type in the form of a powder, microspheres, spheres, pills, pellets, saddles, Raschig rings, rosettes, irregular grains, or the like by any of the techniques known to the art, and incorporate an aqueous solution of a water-soluble platinum compound and a water-soluble inorganic aluminum salt therein by impregnation. For this purpose, we may use chloroplatinic acid, bromoplatinic acid, platinum tetrachloride, platinum dichloride, or the like. The quantities of added platinum and aluminum salt may conveniently be controlled by effecting the addition thereof through imbibition—i. e., by carrying out the impregnation with a aqueous solution of such concentration and volume that it is entirely absorbed in the catalyst particles and the catalyst particles are substantially saturated thereby. To produce this effect, it is ordinarily satisfactory to use between about 75 and 80 grams of solution per 100 grams of alumina. Alternatively, the hydrous, calcined alumina may be impregnated successively with aqueous aluminum salt solution and aqueous platinum-containing solution. In another alternative, the hydrous, calcined alumina may be impregnated with aqueous aluminum salt solution, after which the mixture is dried and/or calcined, suitably at a temperature of about 200 to 400° F. or higher for a period of 1 to 24 hours, and is then impregnated with an aqueous platinum-containing solution. In a further alternative, our solid, finely divided hydrous alumina is commingled with a solid, finely divided aluminum salt, and the resulting mixture is impregnated with platinum solution. The alumina-aluminum salt mixture may be pelleted or otherwise converted into the desired physical form either before or after addition of the platinum. In all cases, the completed catalytic mixture is dried at a temperature between about 200 and 300° F. for about 1 to 24 hours, and is then calcined, ordinarily in air, at a temperature between about 800 and 1200° F., preferably around 1100° F., for a period of 1 to 24 hours. The catalyst can thereafter be subjected to treatment with hydrogen-containing gas at a temperature within the hydroforming range, i. e., between about 850 and 1000° F., which treatment may conveniently be effected as a part of the hydroforming operation itself.

The mechanism whereby our invention produces its advantageous results is obscure. We suggest that it may function by decreasing or modifying the adsorptive capacity of the alumina centers for the platinum compound and/or by forming a compound or complex of platinum and aluminum (or aluminum salt) having a modified affinity for alumina. Our results are especially difficult to explain owing to the fact, which we have observed, that an improved catalyst is not obtained by cogelling an alumina hydrosol with an aluminum salt solution or by impregnation of alumina trihydrate, our technique being effective only with solid, hydrous alumina of restricted water content. In any event, the effect is dramatic, resulting in a catalyst which has an initial activity of 150 to 250, relative to a standard 0.6 percent platinum-on-alumina catalyst having an arbitrarily assigned activity of 100.

Suitable aluminum salts include the nitrate, the sulfate, and other inorganic aluminum salts which can be dissolved in water without separation of hydrous alumina. We prefer to use the soluble halides, specifically the bromide or iodide, or optimally the chloride. In all cases, a hydrate of the chosen salt may also be used. The salt can be used in the form of a finely divided powder, where the technique of dry-mixing with alumina is employed; or it can be used in the form of an aqueous solution where impregnation or imbibition is employed. Such solutions may include an organic solvent or a mixture thereof, such as acetone, methanol, ethanol, isopropyl alcohol, and the like, or other wetting agent, such as sodium benzenesulfonate, a polyethylene glycol, a glycol ether, and the like. The concentration of such solvents may range up to the saturation point or to the point of incompatibility. The concentration of aluminum salt may suitably range upward from about 0.01 M, the exact concentration employed being determined by the quantity of aluminum salt to be added to the catalyst. Concentrations between about 0.01 M and 0.3 M are conveniently employed in connection with the imbibition technique described above. Some degree of activation is produced even when very small quantities of aluminum salt are incorporated in the catalyst. It is desirable, however, to employ the aluminum salt in a molar ratio to the alumina of at least about 0.001:1, anhydrous basis, and we find that the incremental promotional effect of the aluminum salt falls off rapidly at molar ratios above about 0.02:1. In a preferred form of our invention, we employ aluminum chloride in the range of about 0.1 to 3 percent by weight of $AlCl_3$, based on dry $Al_2O_3$, and we have obtained best results in terms of catalyst activation and aluminum salt utilization at proportions between about 0.2 and 2 percent by weight of $AlCl_3$.

The treatment of alumina or alumina composites with aluminum salt solutions according to various embodiments of our invention can be carried out at substantially any temperature, so long as the treating solution is maintained in the liquid phase without deleterious decomposition of the dissolved materials therein. We prefer, however, to employ ordinary pressures and ordinary temperatures within the range of about 50 to 200° F.

In designating the activity of a platinum-alumina hydroforming catalyst, it is convenient to employ a relative activity scale, by means of which the catalyst is compared to a standard catalyst operating under certain fixed conditions. For our standard, we have chosen a catalyst composed of pure Heard-type alumina, containing 0.6 percent by weight of platinum uniformly distributed throughout ⅛″ x ⅛″ cylindrical pills, and the evaluation thereof is carried out at 200 pounds per square inch gage with a once-through hydrogen rate of 5,000 cubic feet per barrel in the hydroforming of a Mid-Continent virgin naphtha having an ASTM boiling range of 200 to 360° F., a CFR–R octane number of 44, a sulfur content (lamp) of 0.03 percent, an API gravity of 56.5, a bromine number of 1.4, a Reid vapor pressure of 1.8 pounds per square inch, and a content of 40 percent naphthenes, 52 percent paraffins, and 8 percent aromatics. When the standard catalyst is employed under the foregoing conditions to hydroform the designated charging stock, its activity at any given temperature and space velocity, as measured by the CFR–R octane number of the $C_5+$ product fraction, is arbitrarily assigned the value of 100.

In setting up the standard of activity, the standard catalyst was first subjected to a series of hydroforming tests over a range of catalyst temperatures and space velocities in a quasi-isothermal laboratory reactor comprising a tubular reaction vessel holding 50 milliliters of catalyst, surrounded by an electrically heated metal block for temperature control, and the CFR–R octane number of the $C_5+$ product fraction from each set of conditions was determined. Since the hydroforming reactions are predominantly endothermic in nature, the catalyst exit temperature is always lower than the catalyst inlet temperature, but the extent of the difference is variable, depending upon the space velocity, the activity of the catalyst (in the case of catalysts other than the standard), and other factors. This variability, we found, could be eliminated by correcting the observed $C_5+$ product fraction octane numbers, the correction being made by subtracting 0.075 octane number per ° F. of temperature difference. The corrected octane numbers were then plotted against the reciprocal of the space velocity as a family of curves with the catalyst exit temperature as the parameter, giving the attached reference graph for use in computing the relative activity of other catalysts.

In measuring the relative activity of a catalyst, it is subjected to a hydroforming test under conditions approximating the standard conditions set forth above. During the test, the average catalyst inlet temperature, the average catalyst exit temperature, and the average space velocity are observed, and the reaction product is collected for determination of the CFR–R octane number of the $C_5+$ fraction thereof. The said product fraction octane number is corrected as described above for the catalyst temperature gradient, and the corrected octane number is then employed in conjunction with the appended reference curves to determine the reciprocal of the equivalent liquid volume space velocity which would be required by the standard catalyst at the same catalyst exit temperature to produce the same product quality. The corresponding space velocity may be termed the "effective liquid volume space velocity" of the catalyst under test, as contrasted with the actual space velocity. Finally, the said reciprocal of the effective liquid volume space velocity is multiplied by the actual liquid volume space velocity (volume of charging stock per volume of catalyst per hour) used in the test, and the quotient is multiplied by 100. The result is the measured activity of the catalyst, relative to the standard catalyst. The said measured activity is the number of volumes of standard catalyst that would be required to accomplish the same result as 100 volumes of the catalyst under test.

Our invention will be more fully understood from the following specific examples.

Example 1

An alumina hydrosol was prepared according to the technique of Heard, described in Reissue Patent 22,196 (October 6, 1942) by amalgamating a quantity of 99.99 percent aluminum metal and reacting the amalgamated aluminum with hot aqueous 2 percent acetic acid. The resulting hydrosol was dried in an oven at 200 to 300° F. and calcined 3 hours at 950° F. The dried cake was crushed, mixed with 4 percent Sterotex as a lubricant, formed into one-eighth inch pills, and calcined six hours at 1100° F.

Twenty pounds of alumina pills, prepared as described above, were impregnated in the following manner. Two identical impregnating solutions were prepared, each measuring 1 liter in volume and containing 34.0 grams of chloroplatinic acid (13.6 grams of platinum) and 92.5 grams of $AlCl_3 \cdot 6H_2O$ (1.12 percent by weight of dry $AlCl_3$, based on dry $Al_2O_3$), dissolved in water. The pills were divided into two-pound batches and placed into Pyrex trays. The impregnating solutions were divided into 200-milliliter aliquots, each of which was diluted with water to 900 milliliters and poured over one of the 2-pound batches of alumina pills. All of the solution in each tray was absorbed by the alumina pills, and the quantity of solution was sufficient to substantially saturate the pills. The pills were dried overnight in the trays at 250° F., and were then calcined in stainless-steel wire baskets for 6 hours at 1100° F. The completed catalyst contained 0.27 percent by weight of platinum, based on dry $Al_2O_3$, uniformly distributed throughout the pills.

A portion of the catalyst was tested in the reforming of a Mid-Continent virgin naphtha having the following inspections:

Boiling range, ASTM:
    Initial _____ ° F__ 200
    10% _____ ° F__ 237
    50% _____ ° F__ 272
    90% _____ ° F__ 360
    End point _____ ° F__ 360
Octane number, CFR-R _____ 44
Sulfur content (lamp) _____percent__ 0.03
Gravity, API _____ 56.5
Reid vapor pressure _____p. s. i__ 1.8
Bromine number _____ 1.4
Composition:
    Naphthenes _____percent__ 40
    Paraffins _____do____ 52
    Aromatics _____do____ 8

A quasi-isothermal laboratory reactor was employed for the test, comprising a tubular reaction vessel holding 50 milliliters of catalyst, surrounded by an electrically heated metal block for temperature control. The block was maintained at a temperature of approximately 935° F., and the hydroforming reaction was carried out at a pressure of 200 pounds per square inch gage, a liquid hourly space velocity of 2, and a once-through hydrogen rate of 5,000 cubic feet per barrel of feed. Under these conditions, the reaction products emerging from the catalyst zone had an average temperature of about 920° F. The products were collected at intervals and tested, with the results given in the table below.

For comparison, a conventional 0.3 percent platinum catalyst of the prior-art type was prepared by commingling ammonium polysulfide with aqueous chloroplatinic acid solution and adding the clear platinum solution obtained thereby to a sufficient quantity of a Heard-type alumina hydrosol, referred to above. The catalytic mixture was dried, calcined, and tested in the hydroforming process under the conditions described above. The results were as follows:

| Product Interval, hr. | $AlCl_3$—$H_2PtCl_6$ Catalyst | | | Conventional Catalyst | | |
|---|---|---|---|---|---|---|
| | Octane No., CFR-R | Measured Activity | Adjusted Activity | Octane No., CFR-R | Measured Activity | Adjusted Activity |
| 0-20 | 99.0 | 169 | 375 | 95.5 | 80 | 160 |
| 20-40 | 97.8 | 156 | 345 | 93.3 | 63 | 126 |
| 40-60 | 97.9 | 151 | 336 | 94.3 | 79 | 158 |
| 60-80 | 97.0 | 133 | 296 | 87.1 | 40 | 80 |
| 80-100 | 96.8 | 126 | 280 | | | |
| 100-120 | 96.6 | | | | | |
| 120-140 | 96.2 | | | | | |
| 140-160 | 95.7 | | | | | |
| 160-180 | 94.1 | | | | | |

In the above table, the "adjusted activity" is the measured (relative) activity multiplied by the ratio of the platinum contents in the standard catalyst and in the catalyst undergoing test. The adjusted activity is thus a measure of the activity of the catalyst in terms of unit weight of platinum. This is an important factor in the evaluation of platinum catalysts, since platinum is so expensive a material that it may constitute a large part of the capital investment in a hydroforming unit in which it is used. From the results of the comparative tests reported in the above table, it is apparent that our new type of catalyst exhibits an adjusted activity of a different order of magnitude compared with the prior-art catalysts.

Example 2

Three catalysts were prepared according to the following procedures:

A. One hundred grams of one-eighth inch alumina pills, prepared as described in Example 1, were impregnated with 75 milliliters of an aqueous solution containing chloroplatinic acid equivalent to 0.1 gram of platinum plus 0.03 gram-mole of $AlCl_3$ (0.4 percent by weight of dry $AlCl_3$ based on dry $Al_2O_3$). The impregnated pills were dried overnight at 220° F. and were then calcined for six hours at 1100° F. The completed catalyst contained 0.13 percent platinum and 0.85 percent Cl.

B. Another catalyst was prepared according to the same procedure, except that the impregnating solution contained 0.3 gram of Pt and 0.008 gram-mole of $AlCl_3$ (1.07 percent $AlCl_3$ on $Al_2O_3$, dry basis). The completed catalyst contained 0.29 percent platinum and 0.70 percent Cl.

C. Another catalyst was prepared according to the same procedure, except that the impregnating solution contained 0.6 gram of platinum and 0.016 gram-mole of $AlCl_3$ (2.13 percent $AlCl_3$ on $Al_2O_3$, dry basis). The completed catalyst contained 0.58 percent Pt and 1.13 percent Cl.

The completed catalysts were tested in the hydroforming process according to the procedure and under the conditions described in Example 1. For comparison, a conventional 0.6 percent platinum-on-alumina catalyst of the prior-art type was tested under the same conditions. The results were as follows:

catalyst contained 0.27 percent by weight Pt and 0.40 percent Cl.

| Product Interval, hr. | Catalyst A | | | Catalyst B | | | Catalyst C | | | Conventional 0.6% Pt Catalyst | |
|---|---|---|---|---|---|---|---|---|---|---|---|
| | Octane No., CFR-R | Measured Activity | Ajusted Activity | Octane No., CFR-R | Measured Activity | Adjusted Activity | Octane No., CFR-R | Measured Activity | Adjusted Activity | Octane No., CFR-R | Measured Activity |
| 0-20 | 99.6 | 174 | 803 | 100.9 | 219 | 453 | 101.2 | 239 | 248 | 97.0 | 105 |
| 20-40 | 98.7 | 146 | 674 | 100.1 | 200 | 414 | 100.0 | | | 95.0 | 75 |
| 40-60 | 98.2 | | | 99.3 | 171 | 354 | 99.3 | 164 | 170 | 94.4 | 91 |
| 60-80 | 97.6 | | | 98.0 | 149 | 308 | 99.0 | 167 | 173 | 93.0 | 63 |
| 80-100 | 97.7 | 115 | 531 | 97.3 | 140 | 290 | 98.1 | 145 | 150 | 92.8 | 58 |
| 100-120 | 97.0 | | | 96.6 | 113 | 234 | 97.0 | | | 89.8 | 46 |
| 120-140 | 96.5 | 100 | 461 | 97.1 | 130 | 269 | 96.8 | 111 | 115 | | |
| 140-160 | 96.4 | | | 96.3 | 103 | 213 | 97.3 | | | | |
| 160-180 | 96.1 | | | 95.2 | 90 | 186 | 96.4 | | | | |
| 180-200 | 95.2 | 78 | 360 | 95.2 | 84 | 174 | 96.8 | 105 | 109 | | |
| 200-220 | 95.0 | | | 95.1 | 98 | 203 | 96.3 | | | | |
| 220-240 | 93.9 | 68 | 314 | 94.8 | 98 | 203 | 95.3 | | | | |
| 240-260 | 93.3 | 59 | 272 | 95.7 | 86 | 178 | 95.3 | 79 | 82 | | |
| 260-280 | 92.6 | | | | | | | | | | |

After the test on catalyst B had been completed, the carbon was burned from the catalyst with oxygen at a maximum measured temperature of 830° F. during a period of 6 hours. Thereafter, the catalyst was soaked in oxygen at 1 atmosphere and 1100° F. for 14 hours. The hydroforming cycle was then resumed, and it was found that the activity of the catalyst had been restored to a considerable extent by the oxidative rejuvenation treatment.

| Product Interval, hr. | Octane No., CFR-R | Measured Activity | Adjusted Activity |
|---|---|---|---|
| 0-20 | 97.3 | 122 | 252 |
| 20-40 | 96.2 | | |
| 40-60 | 96.9 | | |
| 60-80 | 96.1 | 108 | 224 |
| 80-100 | 96.1 | | |
| 100-120 | 96.3 | | |
| 120-140 | 96.2 | 106 | 220 |
| 140-160 | 97.0 | | |
| 160-180 | 96.1 | 89 | 184 |
| 180-200 | 96.0 | | |
| 200-220 | 94.8 | 74 | 153 |
| 220-240 | 93.3 | | |
| 240-260 | 93.4 | | |
| 260-280 | 92.5 | 71 | 147 |
| 280-300 | 91.4 | | |
| 300-320 | 93.6 | 81 | 168 |

*Example 3*

Two catalysts were prepared according to the following procedures:

D. One hundred grams of one-eighth inch alumina pills, prepared as described in Example 1, were impregnated with 80 milliliters of an aqueous solution containing chloroplatinic acid equivalent to 0.3 gram of Pt and 2 grams of $AlCl_3 \cdot 6H_2O$ (1.1 percent by weight $AlCl_3$ on $Al_2O_3$, dry basis). This quantity of solution was just sufficient to wet the pills. The mixture was dried overnight at 220° F. and then calcined 6 hours at 1100° F. The completed catalyst contained 0.31 percent by weight Pt and 0.64 percent Cl.

E. Another catalyst was prepared according to the same procedure, except that 75 milliliters of impregnating solution were used, containing chloroplatinic acid equivalent to 0.3 gram of Pt and 0.4 gram of $AlCl_3 \cdot 6H_2O$ (0.22 percent $AlCl_3$ on $Al_2O_3$, dry basis). The completed catalyst contained 0.27 percent by weight Pt and 0.40 percent Cl.

The two catalysts were subjected to a hydroforming test as described in Example 1, with the following results:

| Product Interval, hour | Catalyst D | | | Catalyst E | | |
|---|---|---|---|---|---|---|
| | Octane No., CFR-R | Measured Activity | Adjusted Activity | Octane No., CFR-R | Measured Activity | Adjusted Activity |
| 0-20 | 98.4 | 168 | 325 | 96.8 | 104 | 232 |
| 20-40 | 96.9 | 115 | 223 | 96.5 | 95 | 212 |
| 40-60 | 97.3 | 120 | 232 | 95.3 | 79 | 176 |
| 60-80 | 96.0 | 101 | 196 | | | |
| 80-100 | 95.3 | 91 | 176 | | | |
| 100-120 | 95.5 | 87 | 169 | | | |
| 120-140 | 95.1 | 95 | 184 | | | |
| 140-160 | 96.0 | 100 | 194 | | | |
| 160-180 | 95.4 | 87 | 169 | | | |

*Example 4*

One hundred grams of one-eighth inch alumina pills, prepared as described in Example 1, were impregnated with 75 milliliters of an aqueous solution containing chloroplatinic acid equivalent to 0.3 gram of Pt plus 3 grams of $Al(NO_3)_3 \cdot 9H_2O$ (1.7 percent by weight $Al(NO_3)_3$ on $Al_2O_3$, dry basis). The mixture was dried 48 hours at 220° F. and then calcined 6 hours at 1100° F. The completed catalyst contained 0.27 percent by weight Pt and 0.29 percent Cl. A hydroforming test under the conditions defined in Example 1 gave the following results:

| Product Interval, hr. | Octane No., CFR-R | Measured Activity | Adjusted Activity |
|---|---|---|---|
| 0-20 | 97.1 | 110 | 245 |
| 20-40 | 96.0 | 87 | 194 |
| 40-60 | 94.8 | 73 | 162 |

*Example 5*

One hundred grams of one-eighth inch alumina pills, prepared as described in Example 1, were impregnated with 70 milliliters of an aqueous solution containing chloroplatinic acid equivalent to 0.3 gram of Pt plus 5.3 grams of $AlBr_3$ (0.0199 mole of $AlBr_3$ per mole of $Al_2O_3$, dry basis). The mixture was dried 16 hours at 220° F. and calcined 6 hours at 1100° F. The completed catalyst contained 0.3 percent by weight Pt and 0.2 percent Br. When subjected to a hydroforming test under the conditions described in Example 1, the catalyst gave the following results:

| Product Interval, hr. | Octane No., CFR-R | Measured Activity | Adjusted Activity |
|---|---|---|---|
| 0-20 | 93.0 | 62 | 124 |
| 20-40 | 91.7 | 54 | 108 |
| 40-60 | 91.5 | 53 | 106 |
| 60-80 | 91.0 | 51 | 102 |

Certain embodiments of our invention, in which pelleted alumina is exposed to contact with water and an aluminum salt of the defined class, exhibit the additional striking advantage that the completed catalyst composition, after drying and calcination, has a crushing strength from 2 to 3 times as great as the untreated alumina. This is an important advantage in connection with the production of catalysts for use in fixed-bed units, where the catalyst pellets are commonly subjected to large stresses because of their own weight and because of the turbulent passage of reacting materials therethrough. The advantageous effect of our process in this connection is demonstrated by the following table, which compares the axial crushing strengths of certain catalysts described above in the operating examples with the axial crushing strengths of the alumina pills from which they were prepared.

| Example No. | Catalyst Identification | Crushing Strength, lb. | |
|---|---|---|---|
| | | Original $Al_2O_3$ | Completed Catalyst |
| 1 | Treated | 15 | 24 |
| 2 | A | 6.9 | 23 |
| | B | 6.9 | 14.5 |
| | C | 6.9 | 13.2 |
| 3 | D | 10.4 | 22.0 |
| | E | 10.4 | 23.0 |
| 4 | | 10.4 | 15.7 |

While we have described our invention with reference to certain specific embodiments thereof, it should be understood that such embodiments are illustrative only and not by way of limitation. Various modifications of our invention and alternative operating procedures and conditions will be apparent from the foregoing description to those skilled in the art.

In accordance with the foregoing description, we claim as our invention:

1. A method for preparing an alumina-based hydroforming catalyst of improved activity having platinum uniformly distributed therein, which comprises impregnating solid, hydrous alumina containing between about 1 and 30 percent by weight of combined water in the presence of between about 0.001 and 0.02 mole of a substance selected from the group consisting of aluminum nitrate, aluminum sulfate, aluminum chloride, aluminum bromide, and aluminum iodide per mole of dry $Al_2O_3$ with a solution of a platinum compound in a quantity whereby platinum is added thereto in a proportion between about 0.01 and 1 percent by weight, based on dry $Al_2O_3$, and drying and calcining the resulting catalytic mixture.

2. In a method for preparing a platinum-alumina hydroforming catalyst, wherein hydrous alumina is combined with a solution of a platinum compound in a quantity sufficient to incorporate between about 0.01 and 1 percent by weight of platinum therein, and the resulting catalytic mixture is dried and calcined, the improvement which comprises subjecting said hydrous alumina to a preliminary drying step at a temperature between about 400 and 1300° F. for a period of around 1 to 24 hours, sufficient to dry said hydrous alumina to a combined water content between about 1 and 30 percent by weight, dry basis, and effecting said combination thereof with said solution of a platinum compound in the presence of between about 0.001 and 0.02 mole of a substance selected from the group consisting of aluminum nitrate, aluminum sulfate, aluminum chloride, aluminum bromide, and aluminum iodide per mole of $Al_2O_3$, whereby a catalyst of improved activity and of uniform distribution of platinum is obtained.

3. A method for preparing a platinum-alumina hydroforming catalyst of improved activity having between about 0.01 and 1 percent by weight of platinum, based on dry $Al_2O_3$, uniformly distributed therein, which comprises combining solid, hydrous alumina containing between about 1 and 30 percent by weight of combined water, based on dry $Al_2O_3$, with between about 0.001 and 0.02 mole of a substance selected from the group consisting of aluminum nitrate, aluminum sulfate, aluminum chloride, aluminum bromide, and aluminum iodide per mole of $Al_2O_3$, impregnating the resulting mixture with a solution of a platinum compound in a quantity whereby platinum is added thereto in a proportion within the said range, and drying and calcining the resulting catalytic mixture.

4. The method of claim 3 wherein said substance is aluminum chloride.

5. The method of claim 3 wherein said substance is aluminum nitrate.

6. A method for preparing a platinum-on-alumina hydroforming catalyst of improved activity and of uniform platinum distribution, which comprises commingling finely-divided, hydrous alumina containing between about 1 and 30 percent by weight of combined water, based on dry $Al_2O_3$, with a finely-divided substance selected from the group consisting of aluminum nitrate, aluminum sulfate, aluminum chloride, aluminum bromide, and aluminum iodide, impregnating the resulting mixture with an aqueous solution of a platinum compound, the proportion of said finely-divided substance being between about 0.001 and 0.02 mole per mole of dry $Al_2O_3$, and the proportion of platinum in said platinum compound being between about 0.01 and 1 percent by weight, based on dry $Al_2O_3$, and drying and calcining the resulting mixture.

7. A method for preparing a platinum-on-alumina hydroforming catalyst of improved activity and of uniform platinum distribution, which comprises impregnating solid, hydrous alumina containing between about 1 and 20 percent by weight of combined water, dry basis, with an aqueous solution of chloroplatinic acid and aluminum chloride, the proportion of $AlCl_3$ being between about 0.1 and 3 percent by weight, based on dry $Al_2O_3$, and the proportion of platinum in said chloroplatinic acid being between about 0.01 and 1 percent by weight, based on dry $Al_2O_3$, and drying and calcining the resulting mixture.

8. A method for preparing a platinum-on-alumina hydroforming catalyst of improved activity and of uniform platinum distribution, which comprises impregnating solid, hydrous alumina containing between about 1 and 10 percent by weight of combined water, dry basis, with an aqueous solution of chloroplatinic acid and aluminum chloride, the proportion of $AlCl_3$ being between about 0.2 to 2 percent by weight, based on dry $Al_2O_3$, and the proportion of platinum in said chloroplatinic acid being between about 0.01 and 1 percent by weight, based on dry $Al_2O_3$, and drying and calcining the resulting mixture.

9. A platinum-alumina hydroforming catalyst of improved activity having between about 0.01 and 1 percent by weight of platinum, based on dry $Al_2O_3$, uniformly distributed therein, prepared by impregnating solid, hydrous alumina containing between about 1 and 30 percent by weight of combined water in the presence of between about 0.001 and 0.02 mole of a substance selected from the group consisting of aluminum nitrate, aluminum sulfate, aluminum chloride, aluminum bromide, and aluminum iodide per mole of dry $Al_2O_3$ with a solution of a platinum compound in a quantity whereby platinum is added thereto in a proportion within the said range, and drying and calcining the resulting catalytic mixture.

10. The catalyst of claim 9 wherein said substance is aluminum chloride.

11. The catalyst of claim 9 wherein said substance is aluminum nitrate.

12. A platinum-on-alumina hydroforming catalyst of improved activity and of uniform platinum distribution, prepared by impregnating solid, hydrous alumina containing between about 1 and 20 percent by weight of combined water, dry basis, with an aqueous solution of chloroplatinic acid and aluminum chloride, the proportion of $AlCl_3$ being between about 0.1 and 3 percent by weight, based on dry $Al_2O_3$, and the proportion of platinum in said chloroplatinic acid being between about 0.01 and 1 percent by weight, based on dry $Al_2O_3$, and drying and calcining the resulting mixture.

13. A platinum-on-alumina hydroforming catalyst of improved activity and of uniform platinum distribution, prepared by impregnating solid, hydrous alumina containing between about 1 and 10 percent by weight of combined water, dry basis, with an aqueous solution of chloroplatinic acid and aluminum chloride, the proportion of $AlCl_3$ being between about 0.2 to 2 percent by weight, based on dry $Al_2O_3$, and the proportion of platinum in said chloroplatinic acid being between about 0.01 and 1 percent by weight, based on dry $Al_2O_3$, and drying and calcining the resulting mixture.

14. A reforming process which comprises contacting a petroleum naphtha under hydroforming conditions with a platinum-alumina hydroforming catalyst of improved activity having between about 0.01 and 1 percent by weight of platinum, based on dry $Al_2O_3$, uniformly distributed therein, prepared by impregnating solid, hydrous alumina containing between about 1 and 30 percent by weight of combined water in the presence of between about 0.001 and 0.02 mole of a substance selected from the group consisting of aluminum nitrate, aluminum sulfate, aluminum chloride, aluminum bromide, and aluminum iodide, per mole of dry $Al_2O_3$ with a solution of a platinum compound in a quantity whereby platinum is added thereto in a proportion within the said range, and drying and calcining the resulting catalytic mixture.

15. The process of claim 14 wherein said substance is aluminum chloride.

16. The process of claim 14 wherein said substance is aluminum nitrate.

17. A reforming process which comprises contacting a petroleum naphtha under hydroforming conditions with a platinum-on-alumina hydroforming catalyst of improved activity and of uniform platinum distribution, prepared by impregnating solid, hydrous alumina containing between about 1 and 20 percent by weight of combined water, dry basis, with an aqueous solution of chloroplatinic acid and aluminum chloride, the proportion of $AlCl_3$ being between about 0.1 and 3 percent by weight, based on dry $Al_2O_3$, and the proportion of platinum in said chloroplatinic acid being between about 0.01 and 1 percent by weight, based on dry $Al_2O_3$, and drying and calcining the resulting mixture.

18. A reforming process which comprises contacting a petroleum naphtha under hydroforming conditions with a platinum-on alumina hydroforming catalyst of improved activity and of uniform platinum distribution, prepared by impregnating solid, hydrous alumina containing between about 1 and 10 percent by weight of combined water, dry basis, with an aqueous solution of chloroplatinic acid and aluminum chloride, the proportion of $AlCl_3$ being between about 0.2 and 2 percent by weight, based on dry $Al_2O_3$, and the proportion of platinum in said chloroplatinic acid being between about 0.01 and 1 percent by weight, based on dry $Al_2O_3$, and drying and calcining the resulting mixture.

References Cited in the file of this patent
UNITED STATES PATENTS

| | | |
|---|---|---|
| 2,479,109 | Haensel | Aug. 16, 1949 |
| 2,479,110 | Haensel | Aug. 16, 1949 |
| 2,662,860 | Engel et al. | Dec. 15, 1953 |
| 2,746,937 | Hunter et al. | May 22, 1956 |

UNITED STATES PATENT OFFICE
CERTIFICATE OF CORRECTION

Patent No. 2,840,514                 June 24, 1958

Harry M. Brennan et al.

It is hereby certified that error appears in the printed specification of the above numbered patent requiring correction and that the said Letters Patent should read as corrected below.

Column 2, line 55, for "thus" read -- this --; column 5, line 62, for the numeral "360", opposite "90%", read -- 313 --; column 9, line 49, after the words and period "in the art." and before the paragraph beginning with "In accordance with the" insert the following paragraph:

-- This application is a continuation-in-part of our application Serial No. 379,408, filed September 10, 1953, now abandoned. --;

column 12, line 25, for "platinum-on alumina" read -- platinum-on-alumina --.

Signed and sealed this 9th day of September 1958.

(SEAL)
Attest:

KARL H. AXLINE                          ROBERT C. WATSON
Attesting Officer                     Commissioner of Patents